United States Patent
Axnas et al.

(10) Patent No.: US 7,471,928 B2
(45) Date of Patent: Dec. 30, 2008

(54) MODULATION SCHEME MANAGEMENT

(75) Inventors: Johan Axnas, Solna (SE); Stephen Craig, Nacka (SE); Dayong Chen, Cary, NC (US); Stefan Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 724 days.

(21) Appl. No.: 10/857,359

(22) Filed: Jun. 1, 2004

(65) Prior Publication Data

US 2005/0064890 A1 Mar. 24, 2005

Related U.S. Application Data

(60) Provisional application No. 60/500,691, filed on Sep. 8, 2003.

(51) Int. Cl.
*H04B 1/00* (2006.01)
*H04B 7/00* (2006.01)

(52) U.S. Cl. .......................... 455/69; 455/68; 455/561; 455/101; 455/102; 455/67.11; 455/67.13; 455/452.1; 455/452.2; 370/252; 370/329; 370/332; 370/333; 370/465

(58) Field of Classification Search ......... 455/450–451, 455/452.1–2, 68–70, 561, 101–103, 67.11–16; 370/252–253, 329–333, 464–466
See application file for complete search history.

(56) References Cited

U.S. PATENT DOCUMENTS

| 6,298,092 | B1 * | 10/2001 | Heath et al. ................. 375/267 |
| 6,668,159 | B1 | 12/2003 | Olofsson et al. |
| 7,149,245 | B2 | 12/2006 | Budka et al. |
| 7,215,650 | B1 * | 5/2007 | Miller et al. ................. 370/315 |
| 2002/0128027 | A1 * | 9/2002 | Wong et al. ................. 455/513 |
| 2003/0045307 | A1 * | 3/2003 | Arviv et al. ................. 455/464 |
| 2004/0180695 | A1 * | 9/2004 | Sano ........................... 455/561 |

(Continued)

FOREIGN PATENT DOCUMENTS

EP  1 255 368 A1  11/2002

(Continued)

OTHER PUBLICATIONS

Yang et al, "Adaptive Modulation and Coding in 3G Wireless Systems;" Vehicular Technology Conference, 2002; VTC 2002-Fall; 2002 IEEE 56th; pp. 544-548.

(Continued)

*Primary Examiner*—Tuan A Tran
(74) *Attorney, Agent, or Firm*—Nixon & Vanderhye P.C.

(57) ABSTRACT

The invention involves selection of modulation scheme for a mobile unit (100) having access to a link quality enhancing algorithm (130) operable only on data modulated using a subset of the available modulation schemes. The mobile unit (100) performs signal quality measurements on a communications link (410), over which data modulated with a first modulation scheme is communicated. A link quality measure is then determined for this first modulation. A quality enhancement due to operation of the algorithm (130) is also determined. This quality measure and the quality enhancement are used for generating decision information, which is reported to the network (200). There the information is used for estimating link quality measure(s) of currently non-employed modulation(s) for the mobile unit (100). The selection of a modulation scheme for the communications link is then performed based on the decision information and the estimated quality measure(s).

21 Claims, 6 Drawing Sheets

U.S. PATENT DOCUMENTS

2005/0064890 A1    3/2005   Johan et al.
2005/0118959 A1*   6/2005   Johan et al. .............. 455/67.11
2005/0226182 A1*  10/2005   Itoh ........................... 370/329

OTHER PUBLICATIONS

International Search Report mailed Dec. 6, 2004 in PCT application No. PCT/SE2004/001190.

Glisic et al, "Multilayer LMS Interference Suppression Algorithms for CDMA Wireless Networks", IEEE Transactions on Communications, vol. 48, No. 8, Aug. 2000, pp. 1413-1422.

Ericsson, "Link Quality Control Metrics for EGPRS", Tdoc SMG2 EDGE 199/99 rev1., Jun. 21-23, 1999, Stockholm, Sweden.

* cited by examiner

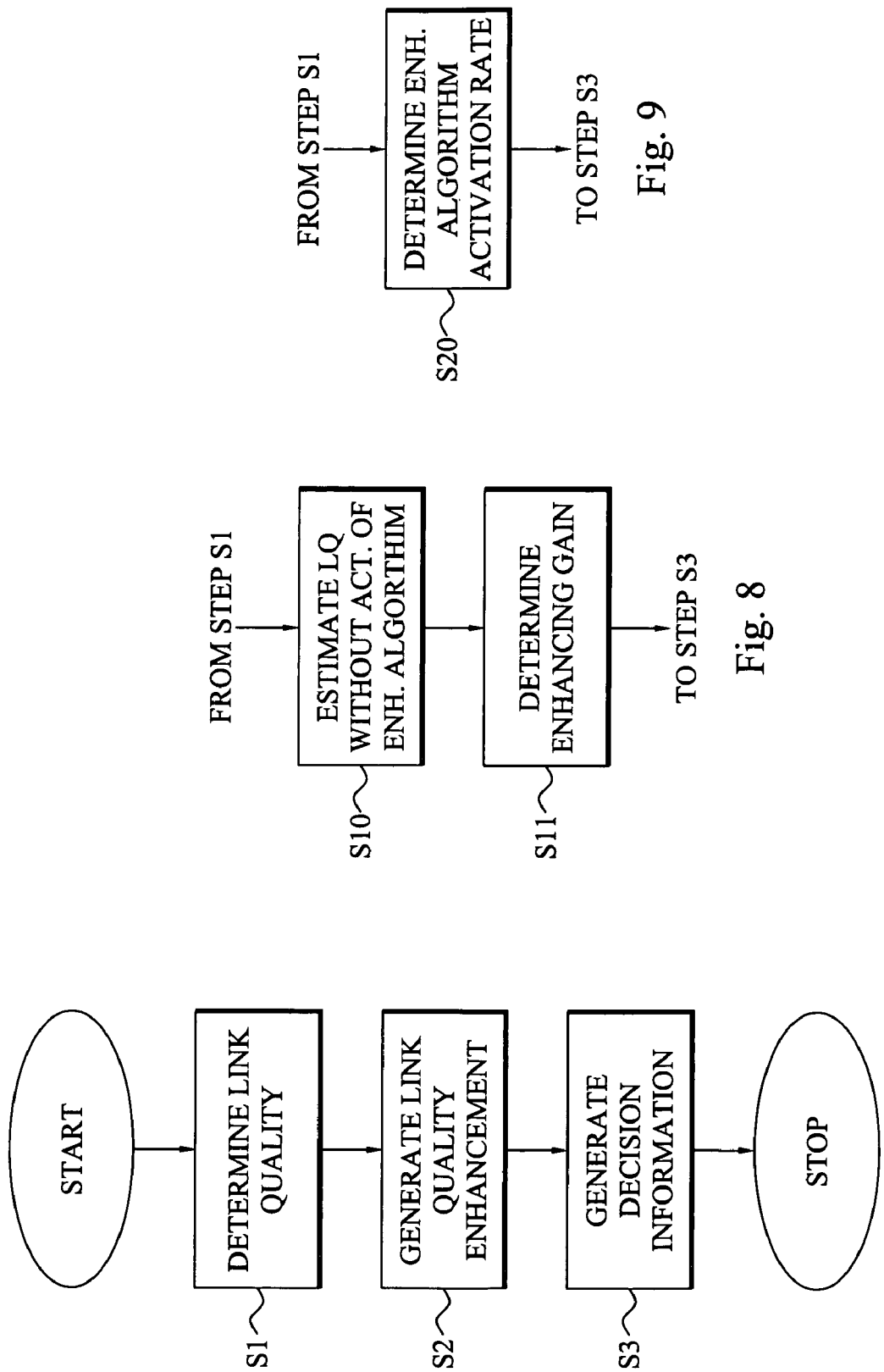

MODULATION SCHEME MANAGEMENT

This application claims priority to U.S. Provisional Application 60/500,691 filed 08 Sep. 2003. The entire contents of this application is incorporated herein by reference.

TECHNICAL FIELD

The present technology generally relates to modulation scheme management in radio communications systems, and in particular to management of modulation schemes affected by employment of performance enhancing techniques in such systems.

BACKGROUND

Radio communications systems of today typically employ a modulation scheme, in which an intelligence-bearing signal is superimposed or mixed into a propagating carrier signal.

For some communications systems, including a GSM (Global System for Mobile Communications) or GPRS (General Packet Radio Service) system, the sole choice of available modulation scheme has been GMSK (Gaussian Minimum Shift Keying). GMSK is a kind of constant-envelope phase modulation, where transmitting a zero bit or one bit is represented by a change in the phase. Thus, every transmitted symbol represents one bit.

Introduction of the EDGE (Enhanced Data rates for GSM Evolution) technology into a GPRS systems provides another modulation scheme to be employable for radio communications, namely 8-PSK (8-state Phase Shift Keying). 8-PSK enables reuse of the channel structure, channel width and the existing mechanisms and functionality of the GMSK-using GPRS system. However, 8-PSK enables higher bit rates per time slot than those available for GMSK. 8-PSK is a linear method that uses phase and amplitude modulation, in which three consecutive bits are mapped onto one symbol. Although the symbol rate remains the same as for GMSK, each symbol now represents three bits instead of one, thus, increasing the total data rate by a factor of three.

An EGPRS (Enhanced GPRS) system having access to both GMSK and 8-PSK modulation can use nine different modulation coding schemes, MCS1 to MCS9. The lower four coding schemes use GMSK whereas the upper five use 8-PSK. These nine MCS use different error correction and, consequently, are adapted for usage under different radio environment conditions. Generally, in good radio environments a more aggressive (less error correction, 8-PSK-associated MCS) coding scheme can be used to provide a higher user data rate, whereas with a poor radio link environment a coding scheme with more error correction (GMSK-associated MCS) and lower user data rate is typically used.

The EGPRS system also employs link quality control functionality denoted link adaptation. Link adaptation uses radio link quality measurements from a mobile unit to select the most appropriate modulation coding scheme for transmission of subsequent data packets to the mobile unit. Such a measurement report from the mobile unit includes only link quality measurements, e.g. BEP (Bit Error Probability), for the modulation that has been used since a last measurement report. However, since the link quality measurements are dependent on the particular modulation scheme employed, the network has to make an assumption about the relative performance of GMSK modulation and 8-PSK modulation. For example, if the network receives a report with a BEP for data received by the mobile unit and modulated by GMSK, the network "maps" this GMSK BEP to a corresponding estimated 8-PSK BEP value.

A major problem with this prior art procedure is that the network uses a single fixed modulation scheme BEP mapping. However, the actual relative performance of GMSK and 8-PSK modulation may vary from one radio environment to another. This problem also aggravates in situations where the mobile unit employs interference-suppressing techniques for data modulated using one of modulation schemes but not for the other scheme(s). A typical example is the so-called SAIC (Single Antenna Interference Cancellation) or SAIR (Single Antenna Interference Rejection) technique that presently only can be used in conjunction with GMSK modulation. Since SAIC can improve the GMSK performance up to about e.g. 9 dB depending on the actual radio environment and traffic load, a relative uncertainty of up to 9 dB is introduced for the GSMK BEP mapping into a 8-PSK BEP value. As a consequence, the network may select a non-optimal modulation coding scheme for a mobile unit, possibly resulting in a loss of radio blocks intended to the mobile unit.

SUMMARY

The present technology overcomes these and other drawbacks of the prior art arrangements.

The present technology provides an improved modulation scheme management in communications systems.

The technology provides more accurate decision information used in the selection of modulation scheme for mobile units in communications systems.

The technology provides a modulation scheme selection that is based on the performance of link quality enhancing algorithms.

Briefly, the present technology involves generation of decision information used in the selection of a modulation scheme out of multiple available modulation schemes to use for data communicated to a mobile unit. This mobile unit also has access to a link quality enhancing algorithm or unit that is operational on data modulated using one or a subset of the available modulations. This means that the link quality experienced by the mobile unit may be enhanced by the algorithm for specific modulation scheme(s) but not for other modulations.

The mobile unit performs modulation-dependent radio link measurements on received radio block modulated with a currently employed modulation. These measurement results are used for determining a link quality measure for this employed modulation. In addition, if the enhancing algorithm is operational for this modulation, the resulting performance or link quality enhancement of the algorithm is determined. The mobile unit then generates decision information based on the link quality measure and the quality enhancement. This decision information is reported to a unit, e.g. PCU (Packet Control Unit), in the network performing the selection of modulation schemes for mobile units. There the decision information forms basis for this modulation selection and/or selection of a modulation coding scheme (MCS) associated with the modulation scheme. The inclusion of the current quality enhancement in the decision information enables a much more accurate selection of modulation schemes and avoids potential loss of radio blocks and system stability that may result from a non-ideal choice of modulation.

The PCU typically estimates corresponding link quality measure(s) for the currently non-employed modulation(s) of the mobile unit based on the received decision information, preferably based on the quality measure of the current modulation and the quality enhancement. The selection of an appropriate modulation scheme can then be based on the received decision information and the estimated quality measure(s).

The quality enhancement of the algorithm can be generated by determining a link quality measure for the current modulation with operation of the enhancing algorithm and determining a corresponding quality measure for the same modulation but without activation of the algorithm. The performance gain can then be expressed as the difference between the two quality measures of the given modulation or as a ratio of them.

Alternatively, if the enhancing algorithm is activated in some bursts (for some radio blocks) and deactivated in other bursts, an activation ratio could be determined and used as a quality enhancement measure. This burst-based activation is typically due to that the gain of the enhancing algorithm is dependent on the current traffic situation and load and may vary from its maximum enhancement gain down to zero gain, or possible even leading to deterioration of the link quality for the given modulation. Thus, the algorithm is then preferably activated when it contributes to an enhancement of the link quality. For example, the activation ratio could be expressed as the number of radio bursts during which the enhancing algorithm is activated divided by the total number of burst during which the algorithm could potentially have been activated. This activation ratio may optionally be complemented with an average enhancement gain for the algorithm in order to obtain more detailed quality enhancement data.

If the enhancement gain of the algorithm is dependent on the current traffic situation, the quality enhancement included in the decision information preferably reflects the current quality enhancement, e.g. the last determined enhancement of the algorithm. Alternatively, an average quality enhancement over multiple radio blocks/bursts or over a period of time could be used. In such a case, a weighted average is preferably used with increasingly larger weights for the most recently received radio blocks in order to obtain a quality enhancement that is as up to date as possible.

Example of modulation schemes according to the invention inlcude the GMSK (Gaussian Minimum Shift Keying) and 8-PSK (8-state Phase Shift Keying), with examples of enhancing algorithms as SAIC (Single Antenna Interference Cancellation) or SAIR (Single Antenna Interference Rejection), which are only applicable on GMSK-modulated data and not 8-PSK data.

The technology offers the following advantages:
Improves the accuracy in estimating link quality measures for currently employed and currently not employed modulation schemes;
Allows the network to select, at any time instant, the optimal modulation scheme for a mobile unit;
Enhances the user bit rate; and
Improves the communications system capacity.

Other advantages offered will be appreciated upon reading of the below description of the embodiments of the invention.

SHORT DESCRIPTION OF THE DRAWINGS

One or more principles together with further objects and advantages thereof, may best be understood by making reference to the following description taken together with the accompanying drawings, in which:

FIG. 7 is a flow diagram illustrating the selection information generating method according to an embodiment;

FIG. 8 is a flow diagram illustrating an embodiment of the step of generating a link quality enhancement of FIG. 7 in more detail;

FIG. 9 is a flow diagram illustrating another embodiment of the step of generating a link quality enhancement of FIG. 7 in more detail.

DETAILED DESCRIPTION

Figure 1:
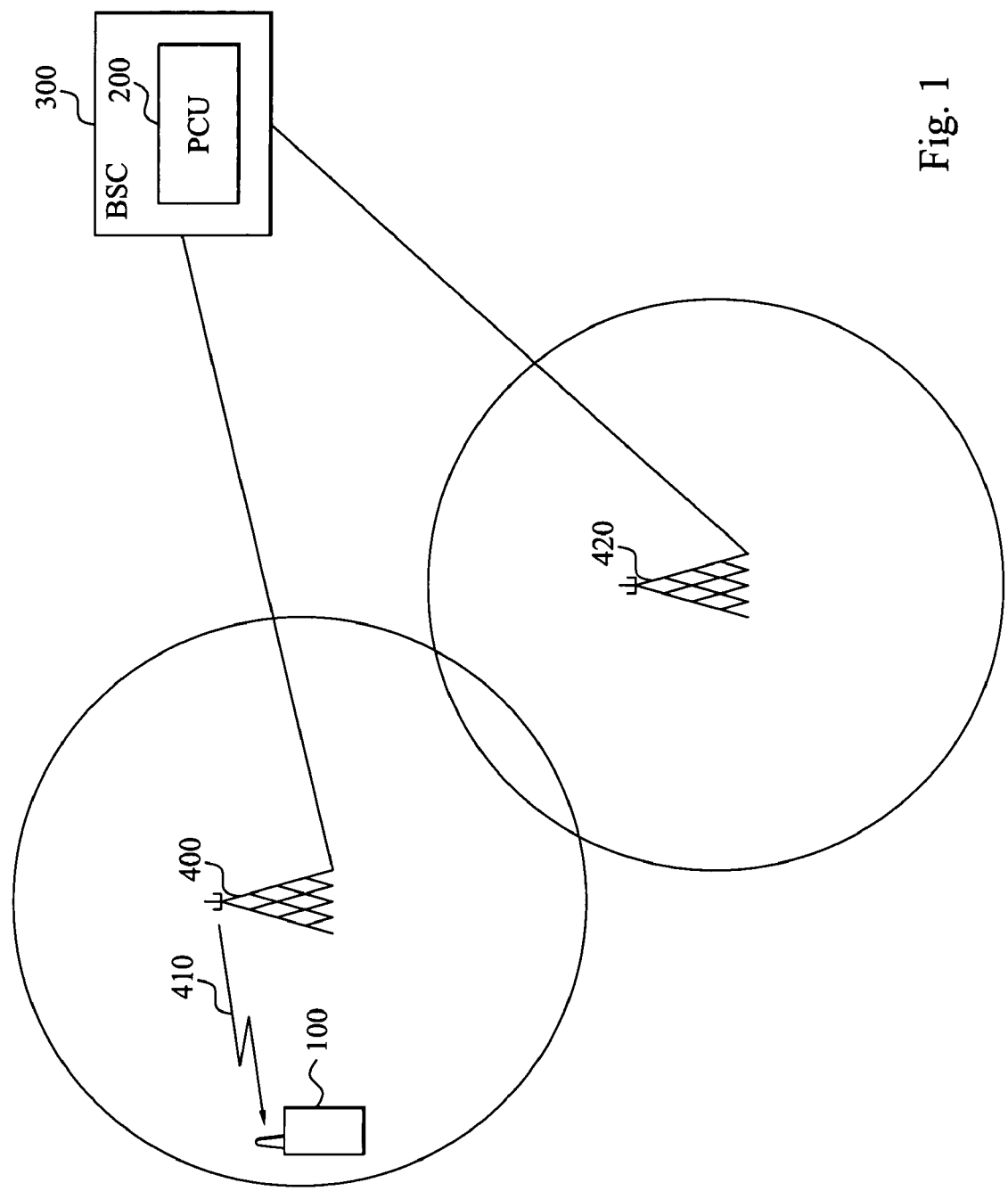
FIG. 1 is a schematic overview of a portion of a radio communications system, to which the teachings of the one or more embodiments can be applied.

Throughout the drawings, the same reference characters will be used for corresponding or similar elements.

In several radio communications systems of today different modulation schemes or techniques are employed for modulating data transmitted on radio communications links through the systems. In cases of multiple available modulation schemes, the selection of an actual modulation scheme to use is then typically based on the radio quality of the communications link . An aspect relates to performing such a modulation scheme selection. According to one or more embodiments, a mobile unit having access to multiple available modulation schemes can use a link quality or performance enhancing algorithm or technique to improve the experienced link quality on a communications link or channel. However, this performance enhancing algorithm may only be operable on one or a subset, which is less than all of the available modulation schemes. This means that the performance enhancement due to this algorithm is only obtained for some specific modulation(s) and not for other modulation schemes. In order to enable an accurate selection of suitable modulation scheme to use for the mobile unit, this performance enhancement should be considered. One such a modulation selection that is, at least partly, based on the performance enhancement experienced by the mobile unit.

In the following, one or more principles will be described and disclosed with reference to a radio communications system having access to two possible modulation schemes, GMSK (Gaussian Minimum Shift Keying) and 8-PSK (8-state Phase Shift Keying). However, the invention is not limited to this actual choice of modulation schemes or to communications systems having access to only two different modulation schemes, but can be applied to a general communications system that that can use multiple, i.e. at least two, different modulation schemes for processing data communicated through the system. Furthermore, in the present example, it is assumed that the performance enhancing algorithm is applicable and operational on data modulated by GMSK but not 8-PSK. However, this should merely be seen as a non-limiting illustrative example and the algorithm could alternatively be applied to 8-PSK and/or some other modulation scheme but not GMSK.

FIG. 1 is a schematic overview of a portion of a radio communications system 1. In FIG. 1, only units directly involved in the description are illustrated in order to simplify the figure. The radio communications system 1 could be a GPRS (General Packet Radio System) system adopting the EDGE (Enhanced Data rates for GSM Evolution) technique or an EGPRS (Enhanced GPRS) system.

Generally, the communications system 1 can include a number of base stations (BS) or base transceiver stations (BTS) 400, 420 providing communications links to connected mobile units 100. These base stations 400, 420 are typically connected to and controlled by a base station controller (BSC) 300 or radio network controller (RNC). This BSC 300 in turn includes functionality or units 200 for selecting modulation schemes to use for the communications link 410 to the mobile units based on link quality measurements or estimations from the mobile units 100 and/or the base stations 400, 420. In the figure, this modulation scheme selecting unit is, non-limitedly, represented by a packet control unit (PCU) 200.

During operation, the mobile unit 100 performs signal or link quality measurements for the (downlink) communications link or channel 410 with its associated base station 400. Based on these measurements a link quality measure is determined or estimated. This determined link quality measure is, however, dependent on the modulation scheme that was used and applied to the data received on the link 410. In addition, the link quality measure will depend on the operation of the link quality enhancing algorithm. Based on this determined link quality measure and the link quality enhancement, the PCU 200 can estimate the corresponding link quality measure(s) for the currently non-employed modulation scheme(s). These quality measures (the one determined by the mobile unit 100 and the one(s) determined by the PCU 200) are used in the selection of suitable modulation scheme for the communications link 410.

In the prior art systems, the selection of modulation scheme has been performed by the PCU 200 without any knowledge of the performance gain caused by operation of the enhancing algorithm. Such prior art solution can, thus, lead to inappropriate modulation selections possibly resulting in loss of transmitted data or radio blocks and system instability.

As an example of the potential problem, consider downlink 410 transmission where the currently selected modulation coding scheme (MCS) is GMSK-modulated. Further assume that the radio environment is suitable for the enhancing algorithm and that the C/I is high enough to give link quality reports from the mobile unit 100 indicating very good GMSK quality. The PCU 200, which does not know that the enhancing algorithm is an important reason for the high GMSK link quality, will switch to 8-PSK. Since the enhancing algorithm does not give gains with 8-PSK modulation, there will be many block errors and many blocks may be lost before the PCU 200 receives a new link quality report from the mobile unit 100 and realizes this and switches back to GMSK modulation. There may then be extensive switching back and forth between the modulations (ping-pong effect), in the worst case resulting in about 50% of the blocks being retransmitted.

Figure 2:
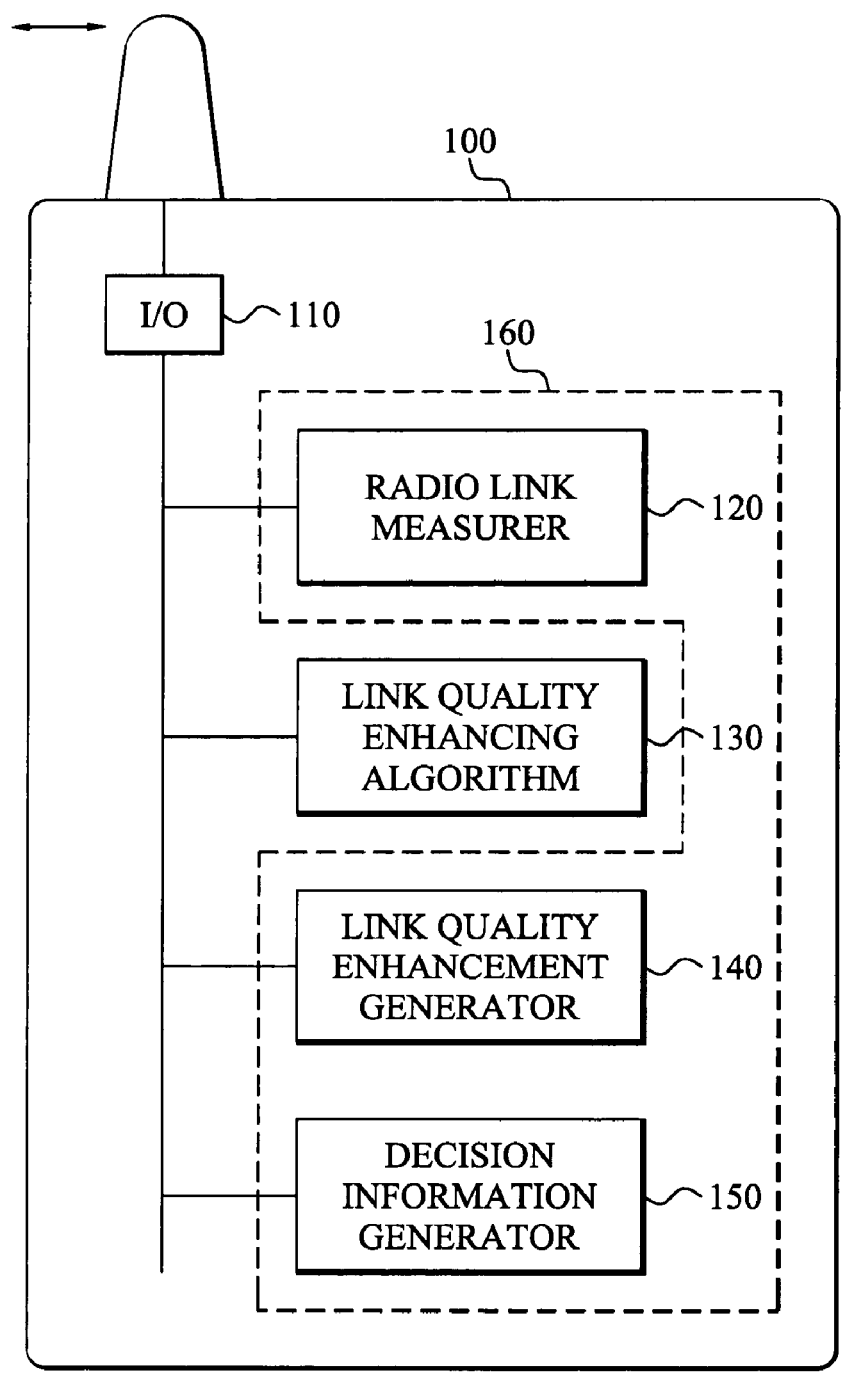
FIG. 2 is a schematic block diagram illustrating a mobile unit according to an embodiment.

FIG. 2 is a schematic block diagram of an embodiment of a mobile unit 100. The mobile unit 100 includes an input and output (I/O) unit 110 for conducting communication with external units and stations. This I/O unit 110 is configured for receiving radio blocks with modulated data from a base station, to which the mobile unit 100 is connected, and for transmitting measurement reports to external units, e.g. a PCU.

The mobile unit 100 further includes a radio link measuring unit or measurer 120 that performs signal measurements on the radio or communications link with the base station. This measuring unit 120 also determines a link quality measure that depends on the modulation scheme presently used for the data received on the link. For example, if GMSK modulation is presently used, the radio link measurer 120 will determine a first GMSK-dependent link quality measure. However, if 8-PSK instead would be used, the radio link measurer 120 would generate a second typically different 8-PSK-dependent link quality measure even though the radio environment would be identical for the two modulation schemes.

The radio link measuring unit 120 preferably performs the link measurements on each received burst or radio block and generates the first link quality measure based on these measurements. Alternatively, the measuring unit 120 could be configured for intermittently or periodically performing the signal measurements, e.g. on every second received radio block or every second 100 ms, or some other periodical interval.

The first link quality measure for the presently employed modulation scheme could be expressed in terms of bit error probability (BEP) or some other signal or link quality measure used in the art.

In a preferred embodiment, the link quality measure is an average quality measure, e.g. average BEP, over multiple received bursts or over a given period of time. This average quality measure could be a weighted average measure using different weights for different received radio blocks. In such a case, a weight used in the measurements in connection with a recently received radio block is then preferably larger than the corresponding weight for a radio block received earlier. Thus, the weighted average link quality measure should, as accurately as possible, reflect the current radio quality environment and situation for the communications link.

Although, the radio link measurer 120 has been described as determining or estimating one link quality measure for a first, presently used, modulation scheme, this measurer 120 could alternatively determine multiple link quality measures associated with this first modulation scheme. For example, the measure could include the average BEP and a coefficient of variation of the BEP, which both will be dependent on the used modulation scheme. Thus, in the present invention, when a modulation-scheme-dependent link quality measure is discussed this also includes multiple related measures associated with the given modulation scheme.

In the following it is assumed that the presently employed modulation scheme for the communications link is GMSK so the radio link measurer 120 will determine a GMSK-dependent link quality measure. Thus, the currently non-employed modulation scheme will then be 8-PSK in the present example. However, this should merely be seen as an illustrative example and the invention can also be applied to cases where 8-PSK or some other modulation scheme is currently used for downlink data to the mobile unit 100.

This mobile unit 100 further has access to a link quality enhancing algorithm or unit 130 that is applicable for data modulated using a subset of the available modulation schemes. For example, the link quality enhancing algorithm 130 could only be operational on GMSK-modulated data but not 8-PSK-modulated data. Typically, such an enhancing algorithm 130 allows usage of a given modulation scheme even under radio conditions that otherwise would not be possible due to a too low link quality. This means that the algorithm 130 is able to enhance the link quality on the communications link experienced by the mobile unit 100 during usage of one or a subset of the modulation schemes.

For example, the enhancing unit 130 could have interference suppressing capability or some other functionality for link quality enhancement.

Since the quality enhancing algorithm 130 may be applicable only to a subset of the available modulation schemes, it will affect the link quality measures for this/these modulation scheme(s) but not for other modulations. This means that if the obtained link quality enhancement is not considered in the modulation selection process a non-optimal modulation could be selected.

It could also be possible that the mobile unit 100 has access to several different quality enhancing algorithms 130 that are applicable to different subsets of the modulation schemes. For example, a first quality enhancing is operational on GMSK-modulated data but not 8-PSK data, whereas a second enhancing algorithm is only operational on 8-PSK-modulated data. It could also be possible that the multiple enhancing algorithms can be applied to a given modulation. Then these multiple algorithms could be configured for combined quality enhancement or alternatively only one of the algorithms could be operational at a given time. In such a case, the algorithm resulting in the largest quality enhancement is typically selected and used. This decision could be taken on a per burst basis.

Furthermore, the gain or performance of the enhancing algorithm 130 could also be dependent on the actual radio environment, e.g. on the number and relative strength of interfering signals, and/or traffic load. This means that the selection of modulation scheme will be even more insecure if the current link quality gain or enhancement is not used.

Non-limiting examples of such link quality enhancing algorithms 130 that can be applicable according to the invention are Single Antenna Interference Cancellation (SAIC) and Single Antenna Interference Rejection (SAIR).

For example, the current SAIC algorithms only give performance gains when the carrier or link is GMSK modulated. Furthermore, the gain from SAIC depends strongly on the number and relative strengths of the interfering signals. This means that some SAIC algorithms presently may improve the GMSK performance by anything between 0 and 9 dB depending on the radio environment and the employed version of the SAIC algorithm. Thus, the relative performance between GMSK and 8-PSK is uncertain by up to 9 dB if SAIC gain is not used in the selection process. Therefore, it will be very difficult to conduct an accurate modulation scheme selection without knowledge of the SAIC performance.

Thus, a link quality enhancement generator or generating unit 140 is implemented in the mobile unit 100 for determining the quality enhancement caused by operation of the algorithm 130. The generator 140 typically determines such an enhancement as the obtained performance gain caused by the algorithm 130. This could be the average gain over multiple radio blocks or over a certain period of time, e.g. average gain since a last measurement report was generated and transmitted to the PCU.

Since the enhancement algorithm 130 is typically activated in some bursts and deactivated in other bursts, the mobile unit 100 can choose simply to estimate link quality with enhancement gain from all received bursts modulated with the modulation scheme associated with the algorithm and link quality without the enhancement gain from only these bursts where the algorithm is deactivated. These two link qualities can then be used to determine the performance gain of the algorithm 130.

In the case of multiple simultaneously operating enhancing algorithms 130, the generator preferably determines their resulting total quality enhancement or the individual enhancement for each respective algorithm 130.

Note further that since the enhancing algorithm 130 is only applicable on data modulated using a subset of the available modulation schemes, the generator 140 will typically not be operating when the received data (radio blocks) are modulated with one of these other modulation schemes, to which the algorithm 130 is not applicable.

The determined (GMSK) link quality determined by the measurer 120 and the link quality enhancement from the generator 140 are then brought to a decision information generator or generating unit 150. This generator 150 determines decision or selection information based on this quality measure and enhancement data. For example, the selection information could then include the GMSK-dependent link quality measure as determined with activation of the link quality enhancing algorithm 130 and the generated enhancement value (from the generator 140). Alternatively, the information includes the GMSK-dependent link quality measure as determined with activation of the link quality enhancing algorithm 130 and the GMSK-dependent link quality measure as determined without usage of the link quality enhancing algorithm 130.

If the modulation-scheme-dependent link quality measure basically includes multiple values, e.g. an average and a variance value, the generator 150 could be configured to consider all such values or only one or a subset thereof, e.g. the average BEP value of the modulation scheme, in the information generation.

The generated decision information is then preferably transmitted using the I/O unit 110 to an external unit in the communications system that performs the selection of modulation scheme on behalf of connected mobile units, e.g. the PCU of FIG. 1. The decision information, thus, forms basis for this decision and selection process in the external unit. The two modulation schemes 8-PSK and GMSK are each associated with different modulation and coding schemes (MCSs) used for coding the data transmitted over air in the system. As for selection of modulation scheme, the actual choice of a suitable MCS is typically dependent on radio link quality measurements. This means that the decision information can also, or alternatively, be used for selection of an appropriate MCS to use on the downlink to the mobile unit 100.

The link quality enhancement generator 140 and the decision information generator 150 and possibly the radio link measurer 120 could be implemented together in a modulation scheme managing unit 160 that can be arranged in the mobile unit 100 for generation of the decision information.

The units 110 to 150 of the mobile unit 100 may be implemented as software, hardware or a combination thereof.

Figure 3:
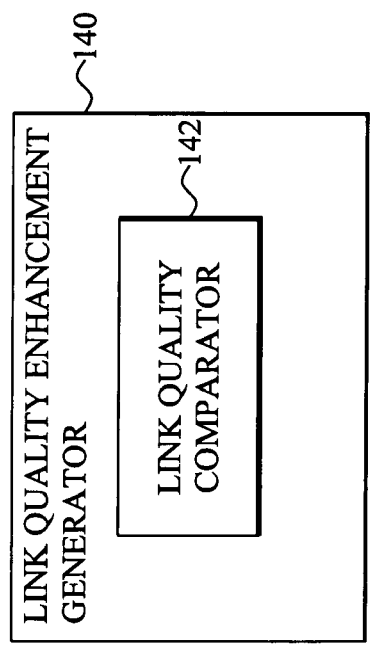
FIG. 3 is a schematic block diagram illustrating an embodiment of the link quality enhancement generator of FIG. 2 in more detail.

FIG. 3 is a schematic block diagram of an embodiment of the link quality enhancement generator 140 of FIG. 2. In this embodiment, the link quality for the modulation scheme(s), to which the enhancing algorithm can be applied, is determined both without activation of the algorithm and with operation of the algorithm. This means that for this/these modulation scheme(s) generally two link quality measures are determined, where the one determined with activation of the algorithm typically is the better one, i.e. smaller if the measure is represented as BEP. A link quality comparator or comparing unit 142 is implemented in the enhancement generator 140 for comparing these two link quality measures for a modulation scheme. The link quality enhancement could be expressed as a difference between the quality measures or as a ratio of them.

The unit 142 of the link quality enhancement generator 140 may be implemented as software, hardware or a combination thereof. The unit 142 may be implemented in the generator 140. However, a distributed implementation is also possible, with the unit 142 provided in elsewhere in the mobile unit.

Figure 4:
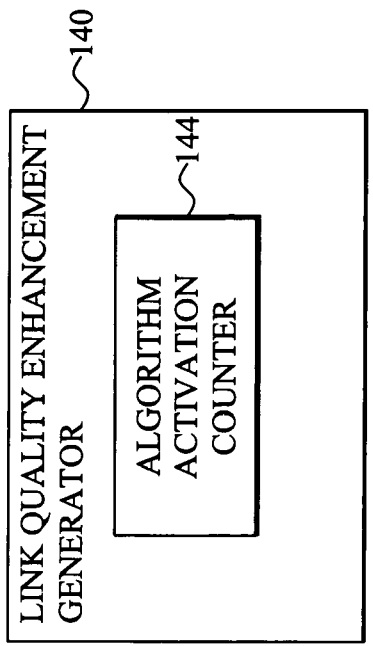
FIG. 4 is a schematic block diagram illustrating another embodiment of the link quality enhancement generator of FIG. 2 in more detail.

FIG. 4 is a schematic block diagram of another embodiment of the link quality enhancement generator 140 of FIG. 2. This embodiment includes an algorithm activation counter 144. As was discussed above, the link quality enhancing algorithm is typically activated for some received bursts or radio blocks but not for others. For example, SAIC can potentially be activated for all received GMSK-modulated radio blocks. However, due to external radio environmental conditions SAIC is typically deactivated in situations where it would not result in any performance enhancement or would worsen the link quality. By counting the number of potential radio blocks for which the algorithm is activated, the counter 144 can determine an activation ratio. Such a ratio could e.g. be defined as the number of radio blocks for which the algorithm was activated divided by the total number of blocks for which the algorithm actually could have been activated, i.e. all received GMSK blocks in the case of SAIC.

Such an activation ratio could be an (rough) indication of the link quality enhancement caused by the algorithm. The activation ratio can also optionally be supplemented with data of the average performance gain obtained by the operation of the algorithm in order to define a more accurate quality enhancement. Alternatively, laboratory measurements can be performed to determine, on average, what performance gain a certain activation ratio corresponds to. For example, an activation ratio of 75% could be used to represent a gain of 7 dB, or a given average gain, e.g. 7 dB could be represented by an interval of activation ratio, e.g. 100-75%. This means that if the counter 144 determines the ratio to be 83%, the algorithm results in a link quality enhancement of 7 dB in this illustrative example.

The unit 144 of the link quality enhancement generator 140 may be implemented as software, hardware or a combination thereof. The unit 144 may be implemented in the generator 140. However, a distributed implementation is also possible, with the unit 144 provided in elsewhere in the mobile unit.

Figure 5:
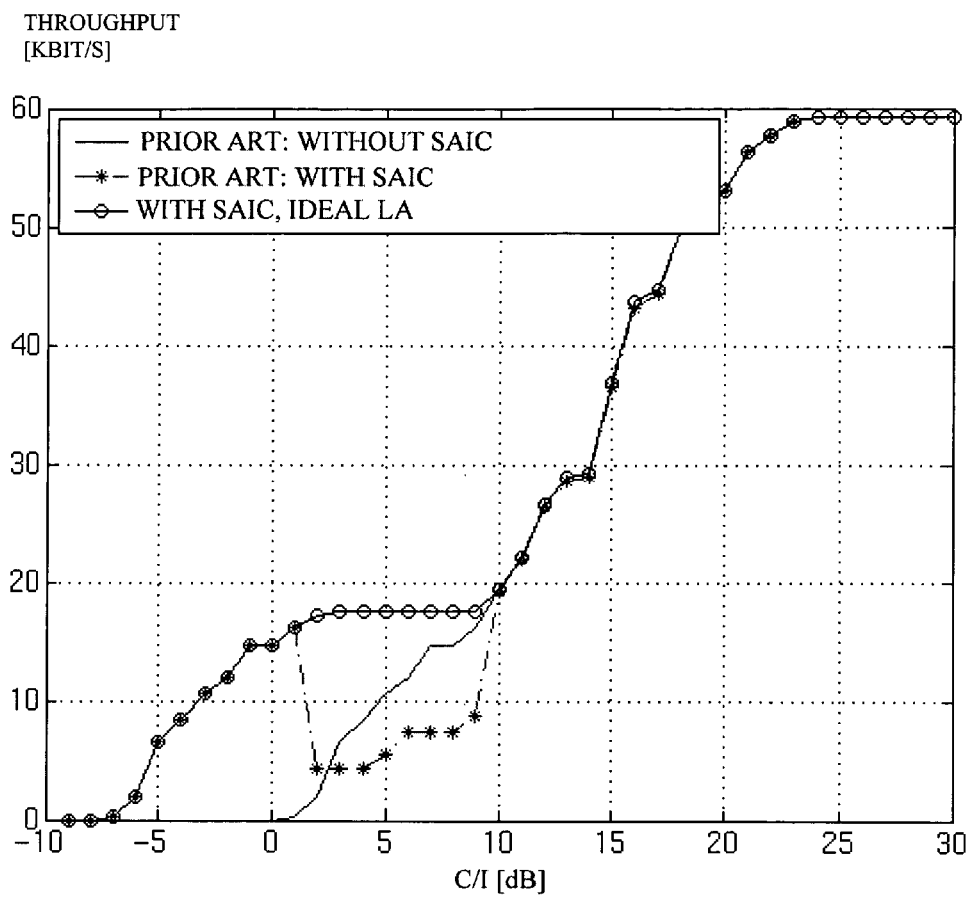
FIG. 5 is a diagram comparing the throughput obtainable according to the one or more embodiments in comparison with prior art solutions.

Link simulations was conducted in order to illustrate the advantage of this embodiment. With reference to FIG. 5, three different cases were simulated. In the first prior art example, continuous line in the figure, (the receiver of) the mobile unit does not have SAIC. The link adaptation is ideal, i.e. optimal modulation scheme and MCS are always selected. In the prior art case two, dashed line with stars, the receiver has SAIC with a gain of about 8 dB only for GMSK modulation. The link adaptation algorithms in the network (PCU) are assumed to be the same as in case 1, i.e. selects modulation schemes and MCS based on GMSK-dependent BEP reports and is not aware of the fact that the relative performance of GMSK and 8-PSK is different. This link adaptation is, thus, not ideal for the SAIC-capable mobile unit. In case 3 of the invention, the receiver has SAIC with a gain of about 8 dB (only for GMSK modulation). The mobile unit notifies the PCU of both GMSK and the SAIC gain. This means that the link adaptation is assumed to be ideal for the case of 8 dB SAIC gain, i.e. the optimal modulation scheme and MCS are always selected.

Furthermore, in the examples no incremental redundancy (IR) was used and it was assumed that retransmissions could be made with any MCS. All simulations were made for a static channel.

As can be clearly seen by comparing case 3 and 2 in FIG. 5, much of the SAIC gain is lost by using a link adaptation that does not correctly know the difference in relative performance between GMSK and 8-PSK. Furthermore, in the region between 4 and 9 dB, the performance is reduced by about 50% for case 2 even compared to case 1. This reduction can be understood from the following example. Assume that the C/I is 7 dB and the downlink transmission uses a GMSK MCS. The mobile unit, supporting SAIC, will report very good BEP measurements (close to error-free reception). Upon receiving the good measurement reports, the network or PCU will assume that the good BEP is due to a high C/I (8 dB higher than the actual C/I due to the SAIC gain of 8 dB). Thus, the PCU will switch to an 8-PSK MCS optimal at C/I=7+8=15 dB, e.g. MCS-7. When the MCS-7 blocks are received, the throughput will drop (close) to zero. The mobile unit will estimate BEP for the 8-PSK blocks and send a report to the PCU. Reading the report, the PCU will (correctly) realize that the C/I is now 7 dB. Unaware of the SAIC capability, the PCU will select a MCS that is optimum for a non-SAIC capable mobile unit at that C/I, e.g. MCS-2. When the MCS-2 blocks are received, reception will be (close to) error-free and the throughput will be at the maximum of MCS-2. The mobile unit will again report a very good BEP and the procedure is repeated. The consequence of this is that despite that e.g. MCS-4 is optimum at C/I=7 dB, the MCS choice is oscillating between MCS-2 and MCS-7, giving an average throughput that is about half the peak throughput of MCS-2.

Figure 6:
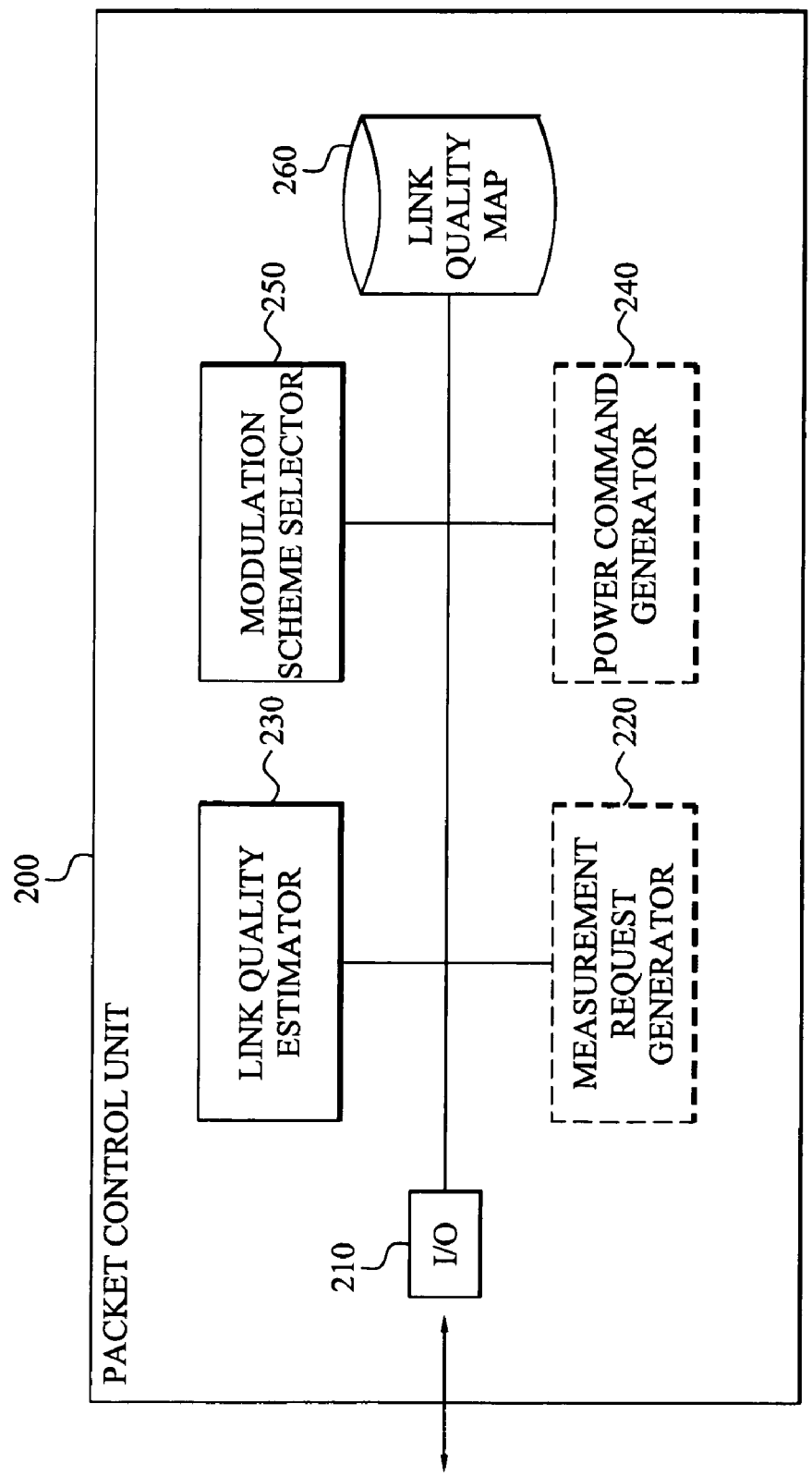
FIG. 6 is a schematic block diagram of a packet control unit according to an embodiment.

FIG. 6 is a schematic block diagram of a unit performing the selection of modulation schemes on behalf of mobile units in the network. In the figure this unit is, non-limitedly, represented by a packet control unit 200. The PCU 200 includes an I/O unit 210 for conducting communications with external units. The I/O unit 210 is configured for receiving link quality measurement reports from mobile units connected to the communications system. Furthermore, the I/O unit 210 could also transmit requests for such reports to mobile units, unless the mobile units are not configured for automatically transmitting such reports.

An optional measurement request generator 220 is implemented in the PCU 200 for generating the request messages that the I/O unit 210 transmits to mobile units, possible via base stations. The generator 220 could be configured for intermittently or periodically generating these reports. However, if the mobile units automatically transmit such reports to the PCU 200, without the need of received requests, this generator 220 could be omitted from the PCU 200.

The PCU 200 also includes a link quality estimator 230 for estimating the corresponding link quality measure(s) for the non-employed modulation scheme(s) for the mobile unit, i.e. 8-PSK-dependent link quality measure in the present example. This estimator 230 is configured for estimating the 8-PSK-dependent link quality measure based on the decision information received in the measurement report from the mobile unit. Since this decision information is generated based on the GMSK-dependent link quality measure and the link quality enhancement, this 8-PSK quality measure will be estimated based on the GMSK quality measure and the quality enhancement.

In a first embodiment, the link quality estimator 230 is configured for generating a corresponding link quality measure for the 8-PSK modulation as the GMSK modulation measure. This means that if the GMSK-dependent measure is represented as BEP, the estimator 230 generates an 8-PSK-dependent BEP value based on the decision information. Correspondingly, if the GMSK measure instead is represented as average BEP and coefficient of variation, the estimator 230 generates an 8-PSK-dependent average BEP and coefficient of variation.

Alternatively, the link quality estimator 230 is configured for generating a less detailed measure for the non-used 8-PSK link quality than the presently used GMSK modulation. For example, if the GMSK link quality measure in the decision information is represented as average BEP and coefficient of variance, the corresponding 8-PSK measure could simply be a BEP value. Alternatively, a single 8-PSK-dependent value could be used to represent an interval of GMSK link quality values. For example, if the determined GMSK-dependent measure is within the interval $X_1$<GMSK-measure<$X_2$, $X_1$<$X_2$ are real numbers, the corresponding estimated 8-PSK-dependent measure should be $Y_1$, whereas if $X_2$<GMSK-measure<$X_3$ $Y_2$ should be selected as 8-PSK-dependent measure, $X_3$, $Y_1$, $Y_2$ are real numbers.

In some communications systems, different maximum transmission power levels may be used for GMSK-modulated radio blocks than for 8-PSK-modulated blocks. A reason could be that the power amplifier non-linearities in the base station transmitter are typically more servere for 8-PSK. An optional power command generator 240 transmits a power level request to the base station communicating with the mobile unit. This request urges the base station to return power level data to the PCU 200. The base station could then report the used power levels for GMSK and the corresponding level for 8-PSK to the PCU 200. Alternatively, a power quantity derived from these power levels, such as ratio between the GMSK power level and the 8-PSK power level, a difference therebetween or some other quantity derived therefrom, could be communicated to the PCU 200. The estimator 230 could then modify the link quality measure from the mobile unit based on such received power data, or otherwise use the power data in the estimation process in order to obtain even more accurate quality estimation that, thus, enables a more accurate modulation scheme selection.

The estimator 230 may use a link quality map or table 260 that lists different 8-PSK and GMSK link quality values. Such a table 260 then allows mapping or conversion between different modulation-dependent quality values. Thus, for a given GMSK quality value the table 260 includes a corresponding 8-PSK value, and vice versa. This means that when the estimator 130 receives the decision information from the I/O unit 210, the estimator 130 performs a look-up in the table 260 and retrieves the corresponding 8-PSK link quality measure.

The table 260 could be implemented to include equally detailed quality measures for the two modulation schemes, e.g. if an average BEP and variance thereof is used for retrieving corresponding 8-PSK measures, an average 8-PSK-dependent BEP and variance may be obtained from the table 260. Alternatively, a less detailed value could be retrieved, e.g. only a single BEP compared to average and variance values. In the case of more than two available modulation scheme, several tables 260 could be implemented in the estimator 130 or a single 260 could list the different link quality values for all of the schemes.

Alternatively, the table 260 is omitted and the estimator 130 instead employs a link quality mapping or converting algorithm or function. Such a function then has the decision information, preferably the GMSK-dependent link quality measure and the link quality enhancement, from the mobile unit as input parameter and outputs a corresponding 8-PSK-dependent quality measure. Other input parameters, such as power level data from the base station, could also be used in the function in order to obtain a more accurate estimated 8-PSK measure. If the GMSK measure is represented by two values, the function could output a single or two 8-PSK values. It could be possible that one and the same function could be used for both converting GMSK values into 8-PSK values and vice versa. Alternatively, and also if more than two modulation schemes are possible, several different converting functions can be implemented in the estimator 130.

The mapping table 260 and/or the function is preferably generated based on the average capabilities of the mobile units, in particular based on the modulation schemes employable in the mobile units. Such a table or function can be produced based on standard laboratory measurements and/or simulations on different mobile units or the modulation software and/or hardware implemented in the units.

In a first embodiment of the invention, the table 260 or function is configured for considering the possibly different transmission power levels of GMSK and 8-PSK modulation. This means that the table 260 could for each GMSK value list several 8-PSK values but for different values of the power level quantity. Alternatively, the estimator 230 could, once an 8-PSK value has been retrieved from the table 260, modify this value based on the power level quantity.

Alternatively, the link quality estimator 230 and/or table 260 could be provided elsewhere in the communications network than in the PCU 200. However, then the estimated quality measures from such external estimator are transmitted to the PCU 200.

The decision information from the mobile unit and the link quality measure(s) for the currently not employed modulation (s) for the mobile unit—base station communication are forwarded to a modulation scheme selector 250. This selector 250 selects a modulation scheme to use on the (downlink) channel to the mobile unit based on this input information and data.

As is well known in the art, the two modulation schemes 8-PSK and GMSK are each associated with different modulation and coding schemes (MCS) used for coding the data transmitted over air in the system. As for selection of modulation scheme, the actual choice of a suitable MCS is typically dependent on radio link quality measurements. This means that the selector 250 could also, or alternatively, be configured for selecting an appropriate MCS to use on the downlink to the mobile unit based on the decision information and the estimated link quality measure(s).

The units 210 to 250 of the PCU 200 may be implemented as software, hardware or a combination thereof. The units 210 to 260 may all be implemented in the PCU 200 in a single network node in the communications system. However, a distributed implementation is also possible, with the units 210 to 260 provided in different network nodes. For example, the functionalities of the generator 240 could be implemented in different base stations.

FIG. 7 is a flow diagram illustrating a method of generating decision or selection information for selection of a modulation scheme for a mobile unit. The method starts in step S1, where the mobile unit performs modulation-scheme-dependent signal or link quality measurements on radio blocks or bursts received on a communications link from a base station. Based on these measurements a link quality measure for the currently employed modulation scheme (modulation scheme 1) is determined. In a next step S2, a link quality enhancement is generated for the quality enhancing algorithm operational on data modulated using the current modulation scheme. Finally, in step S3, the decision information is generated based on the determined link quality measure and the estimated link quality enhancement. This information will be used for selection of a suitable modulation scheme and/or MCS to use for the mobile unit. The method then ends.

FIG. 8 is a flow diagram illustrating an embodiment the enhancement generating step of FIG. 7. The method continues from step S1. In a next step S10, the link quality for the modulation scheme(s) associated with the enhancing algorithm is determined without activation of the algorithm. Step S11 compares this non-activated link quality with a corresponding link quality measure for the same modulation but with operation of the algorithm. The link quality enhancing gain can now be determined based on these two link quality measures. The method then continues to step S3.

FIG. 9 is a flow diagram illustrating another embodiment the enhancement generating step of FIG. 7. The method continues from step S1. In a next step S20, the activation ratio of the enhancing algorithm is determined. This ratio is typically expressed as the number of burst during which the algorithm was activated divided by the total number of burst during which the algorithm could potentially have been activated. The link quality enhancement can, at least, be estimated based on such activation ratio, and possible other data such as average enhancing gain for the algorithm.

Figure 10:
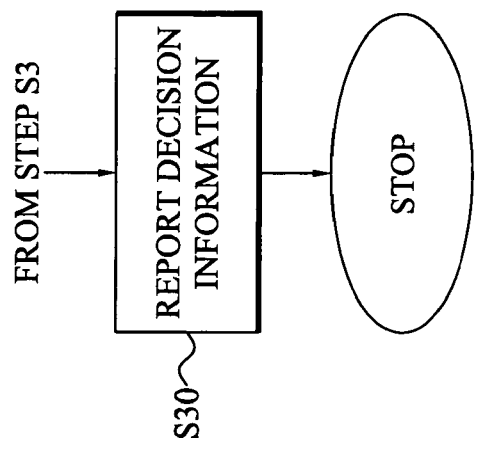
FIG. 10 is a flow diagram illustrating an additional act of the method of FIG. 8.

FIG. 10 is a flow diagram illustrating an additional step of the method of FIG. 7. The method continues from step S3. In a next step S30, the generated decision information is reported to a unit in the communications network performing the modulation selection, e.g. the PCU. This report could be intermittently or periodically transmitted to the PCU. Alternatively, or in addition, the report could be transmitted upon reception of a request from the PCU. In the PCU the received decision information will be used for estimating link quality measure(s) for the currently not employed modulation scheme(s) for the mobile unit. The decision information and the estimated quality measure(s) are then used for selecting a modulation scheme and/or MCS to use for the communications link of the mobile unit.

It will be understood by a person skilled in the art that various modifications and changes may be made to the present invention without departure from the scope thereof, which is defined by the appended claims.

The invention claimed is:

1. A method of generating information for selection of a modulation scheme from multiple modulation schemes available for a mobile unit in a radio communications system, said mobile unit configured to employ a performance enhancing algorithm to enhance a link quality of a communications link employing a subset of said available modulation schemes, said method comprising:
    said mobile unit determining a first modulation-scheme-dependent link quality for said communications link employing a first modulation scheme of said scheme subset;
    said mobile unit generating an enhancement representation of a link quality performance enhancement caused by said performance enhancing algorithm; and
    generating said information for a selection of a modulation scheme based on said first modulation-scheme-dependent link quality and said enhancement representation.

2. The method according to claim 1, wherein said determining act comprises:
    said mobile unit performing measurements of data modulated with said first modulation scheme and received on said communications link;
    said mobile unit determining said first modulation-scheme-dependent link quality based on said measurements.

3. The method according to claim 1, wherein said enhancement representation generating act comprises:
    said mobile unit estimating a second modulation-dependent link quality for said first modulation scheme without usage of said performance enhancing algorithm; and
    said mobile unit determining said enhancement representation based on said first modulation-scheme-dependent link quality and said second modulation-scheme-dependent link quality.

4. The method according to claim 1, wherein said enhancement representation generating act comprises said mobile unit determining a rate of usage of said performance enhancing algorithm, wherein said enhancement representation includes said determined usage rate.

5. The method according to claim 1, wherein said performance enhancing algorithm is an interference suppressing algorithm.

6. The method according to claim 1, further comprising said mobile unit reporting said first modulation-scheme-dependent link quality and said enhancement representation to a modulation scheme selecting unit in said radio communications system.

7. The method according to claim 1, wherein each of said multiple modulation schemes is associated with a unique transmission power level used for communicating data on said communications link to said mobile unit, said method further comprising:
    determining a first transmission power level currently associated with said first modulation scheme; and
    determining a corresponding second transmission power level associated with at least a second modulation scheme,
    wherein said information for the selection of a modulation scheme includes at least one of:
    said first transmission power level and said second transmission power level, and
    a quantity derived from said first transmission power level and said second transmission power level.

8. A mobile unit configured to generate a decision information for a selection of a modulation scheme from multiple available modulation schemes in a radio communications system, comprising:
    performance enhancing means to enhance a link quality of a communications link employing a subset of said available modulation schemes;
    means for determining a first modulation-scheme-dependent link quality for said communications link employing a first modulation scheme of said subset of said available modulation schemes;
    means for generating an enhancement representation of a link quality performance enhancement caused by an operation of said performance enhancing means; and
    means for generating said decision information based on said first modulation-scheme-dependent link quality and said enhancement representation.

9. The mobile unit according to claim 8, further comprising means for receiving data modulated with said first modulation scheme on said communications link, wherein said means for determining are configured to perform link quality measurements of said received and modulated data.

10. The mobile unit according to claim 8, further comprising means for estimating a second modulation-dependent link quality for said first modulation scheme without operation of said performance enhancing means, wherein said means for generating said enhancement representation are configured to determine said enhancement representation based on said first modulation-scheme-dependent link quality and said second modulation-scheme-dependent link quality.

11. The mobile unit according to claim 8, wherein said means for generating said enhancement representation are configured to determine a rate of activation of said performance enhancing means, said enhancement representation comprises said determined activation rate.

12. The mobile unit according to claim 8, wherein said performance enhancing means are configured to enhance the link quality using an interference suppressing algorithm.

13. The mobile unit according to claim 8, further comprising:
means for receiving a link quality measurement request from a modulation scheme selecting unit in said radio communications system; and
means for reporting said generated decision information for the selection of a modulation scheme to said modulation scheme selecting unit upon reception of said link quality measurement request.

14. A modulation scheme managing unit configured to generate decision information for a selection of a modulation scheme from multiple available modulation schemes for a mobile unit in a radio communications system, said modulation scheme unit comprising:
means for providing a first modulation-scheme-dependent link quality for a communications link of said mobile unit employing a first modulation scheme;
means for generating an enhancement representation of a link quality performance enhancement caused by an operation of a performance enhancing algorithm adapted for enhancing the link quality of said communications link employing a subset of said available modulation schemes, wherein said subset of said available modulation schemes includes said first modulation scheme; and
means for generating said decision information based on said first modulation-scheme-dependent link quality and said enhancement representation.

15. The modulation scheme managing unit according to claim 14, further comprising means for receiving data modulated with said first modulation scheme on said communications link, wherein said means for providing are configured for determining said first modulation-scheme-dependent link quality based on link quality measurements of said received and modulated data.

16. The modulation scheme managing unit according to claim 14, further comprising means for estimating a second modulation-dependent link quality for said first modulation scheme without operation of said performance enhancing algorithm, wherein said means for generating said enhancement representation are configured for determining said enhancement representation based on said first modulation-scheme-dependent link quality and said second modulation-scheme-dependent link quality.

17. The modulation scheme managing unit according to claim 14, wherein said means for generating said enhancement representation are configured to determine a rate of activation of said performance enhancing algorithm, wherein said enhancement representation includes said determined activation rate.

18. A modulation scheme managing unit for consistency arranged in a radio communications system for selecting a modulation scheme from multiple modulation schemes available for a mobile unit adapted for employing a performance enhancing algorithm for enhancing the link quality of a communications link employing a subset of said available modulation scheme, said unit comprising:
means for receiving decision information originating from said mobile unit, wherein said decision information includes a first modulation-scheme-dependent link quality for said communications link employing a first modulation scheme of said scheme subset and a representation of a link quality performance enhancement caused by said performance enhancing algorithm; and
means for selecting a modulation scheme for usage for said communications link to said mobile unit based on said received decision information.

19. The modulation scheme managing unit according to claim 18, further comprising means for estimating a second modulation-scheme-dependent link quality for at least a second modulation scheme based on said received decision information, wherein said means for selecting are configured to select the modulation scheme based on said second modulation-scheme-dependent link quality and said received decision information.

20. The modulation scheme managing unit according to claim 19, wherein said means for estimating are configured to determine said second modulation-scheme-dependent link quality from a table mapping link qualities for different modulation-schemes employing said received decision information.

21. The modulation scheme managing unit according to claim 19, wherein each of said multiple modulation schemes is associated with a unique transmission power level used for communicating data on said communications link to said mobile unit, said modulation scheme managing unit further comprising means for receiving, from a base station communicating said data to said mobile unit, a transmission power measure selected from at least one of:
a first transmission power level currently associated with said first modulation scheme and a second transmission power level associated with at least said second modulation scheme, and
a quantity derived from said first transmission power level and said second transmission power level, wherein said estimating means is configured for estimating said second link quality based on said received transmission power measure.

* * * * *

UNITED STATES PATENT AND TRADEMARK OFFICE
CERTIFICATE OF CORRECTION

PATENT NO. : 7,471,928 B2  Page 1 of 1
APPLICATION NO. : 10/857359
DATED : December 30, 2008
INVENTOR(S) : Axnäs et al.

It is certified that error appears in the above-identified patent and that said Letters Patent is hereby corrected as shown below:

On the Title Page, item (12), below "United States Patent", in Column 1, Line 1, delete "Axnas" and insert -- Axnäs --, therefor.

On the Title Page, item (75), under "Inventors", in Column 1, Line 1, delete "Axnas" and insert -- Axnäs --, therefor.

In Column 3, Line 40, delete "inlcude" and insert -- include --, therefor.

In Column 4, Lines 34-48, delete "According to one...........the mobile unit." and insert the same in line 35, as a new paragraph.

In Column 8, Lines 35-43, delete "The two..........mobile unit 100." and insert the same in line 36, as a new paragraph.

In Column 11, Line 17, delete "servere" and insert -- severe --, therefor.

In Column 16, Line 4, in Claim 18, after "unit" delete "for consistency".

Signed and Sealed this

Twenty-sixth Day of May, 2009

JOHN DOLL
*Acting Director of the United States Patent and Trademark Office*